United States Patent
Chen et al.

(10) Patent No.: US 9,571,640 B1
(45) Date of Patent: Feb. 14, 2017

(54) SYSTEMS AND METHODS FOR DETECTING CALLS FROM ILLEGITIMATE CALLING PARTIES

(71) Applicant: Symantec Corporation, Mountain View, CA (US)

(72) Inventors: Joseph Chen, Los Angeles, CA (US); Kamron Farrokh, Culver City, CA (US)

(73) Assignee: Symantec Corporation, Mountain View, CA (US)

(*) Notice: Subject to any disclaimer, the term of this patent is extended or adjusted under 35 U.S.C. 154(b) by 159 days.

(21) Appl. No.: 13/903,953

(22) Filed: May 28, 2013

(51) Int. Cl.
*H04M 1/66* (2006.01)
*H04M 3/436* (2006.01)
*H04M 1/663* (2006.01)

(52) U.S. Cl.
CPC .............. *H04M 3/436* (2013.01); *H04M 1/66* (2013.01); *H04M 1/663* (2013.01)

(58) Field of Classification Search
CPC ............. H04M 3/436; H04M 3/42059; H04M 3/42068; H04M 1/66; H04M 1/663
USPC ................... 379/201.01, 201.02, 210.02, 210.03, 379/211.01, 214.01, 249
See application file for complete search history.

(56) References Cited

U.S. PATENT DOCUMENTS

| | | | |
|---|---|---|---|
| 8,387,141 B1* | 2/2013 | Zhukov ................... | H04L 51/12 726/22 |
| 2008/0075258 A1* | 3/2008 | Liu et al. ................. | 379/210.02 |
| 2009/0103701 A1* | 4/2009 | Garg et al. ............... | 379/142.04 |
| 2009/0147936 A1* | 6/2009 | Won ........................ | H04M 3/38 379/201.02 |
| 2010/0190474 A1* | 7/2010 | Rajguru ................ | H04W 12/08 455/412.1 |
| 2012/0321064 A1* | 12/2012 | Czachor et al. ......... | 379/210.02 |

* cited by examiner

*Primary Examiner* — Antim Shah
(74) *Attorney, Agent, or Firm* — FisherBroyles LLP

(57) ABSTRACT

A computer-implemented method for detecting calls from illegitimate calling parties may include (1) collecting information about a plurality of calls received at a plurality of telephonic devices, (2) analyzing the information about the plurality of calls to identify at least one call pattern of illegitimate calling parties, (3) detecting, at a telephonic device, an incoming call, (4) determining whether one or more calls from the calling party of the incoming call fit the call pattern of illegitimate calling parties, and (5) disposing of the incoming call based at least in part on determining whether the one or more calls from the calling party of the incoming call fit the call pattern of illegitimate calling parties. Various other methods, systems, and computer-readable media are also disclosed.

19 Claims, 7 Drawing Sheets

SYSTEMS AND METHODS FOR DETECTING CALLS FROM ILLEGITIMATE CALLING PARTIES

BACKGROUND

Telephone users may receive calls from various illegitimate calling parties (e.g., fraudulent telemarketers). Typically when a user receives a call, the user is presented with an identifier of the calling party (e.g., the name or the telephone number of the calling party) with which the user may determine the identity of the calling party. Unfortunately, most users may be unable to determine the legitimacy of unrecognized calling parties based solely on identifiers of the unknown calling parties, and as a result some users may unknowingly accept calls from illegitimate calling parties.

While knowledgeable and/or cautious users may be capable of distinguishing calls from illegitimate calling parties from calls from legitimate calling parties and in doing so may prevent themselves from falling victim to calls from illegitimate sources, other less knowledgeable and/or less cautious users may be unable to do so. Accordingly, the instant disclosure identifies and addresses a need for additional and improved systems and methods for detecting calls from illegitimate calling parties.

SUMMARY

As will be described in greater detail below, the instant disclosure generally relates to systems and methods for detecting calls from illegitimate calling parties. In one example, a computer-implemented method for detecting calls from illegitimate calling parties may include (1) collecting information about a plurality of calls received at a plurality of telephonic devices (e.g., an identifier of the calling party of each call and/or one or more attributes of each call), (2) analyzing the information about the plurality of calls to identify at least one call pattern of illegitimate calling parties, (3) detecting an incoming call at a telephonic device, (4) determining whether one or more calls from the calling party of the incoming call fit the call pattern of illegitimate calling parties, and (5) disposing of the incoming call based at least in part on determining whether the one or more calls from the calling party of the incoming call fit the call pattern of illegitimate calling parties.

In some examples, the information about the plurality of calls may include a duration of each call within the plurality of calls, the step of analyzing the information about the plurality of calls may include analyzing the duration of each call within the plurality of calls to identify a threshold duration that indicates illegitimate calling parties, and the step of determining whether the one or more calls from the calling party of the incoming call fit the call pattern of illegitimate calling parties may include determining whether a duration of the one or more calls from the calling party of the incoming call is shorter than the threshold duration.

In other examples, the information about the plurality of calls may include information that indicates whether each call within the plurality of calls was accepted, the step of analyzing the information about the plurality of calls may include analyzing the information that indicates whether each call within the plurality of calls was accepted to identify a threshold acceptance level that indicates illegitimate calling parties, and the step of determining whether the one or more calls from the calling party of the incoming call fit the call pattern of illegitimate calling parties may include determining whether an acceptance level of the one or more calls from the calling party of the incoming call is below the threshold acceptance level.

In another example, the information about the plurality of calls may include information that indicates whether each call within the plurality of calls was returned, the step of analyzing the information about the plurality of calls may include analyzing the information that indicates whether each call within the plurality of calls was returned to identify a threshold return level that indicates illegitimate calling parties, and the step of determining whether the one or more calls from the calling party of the incoming call fit the call pattern of illegitimate calling parties may include determining whether a return level of the one or more calls from the calling party of the incoming call is below the threshold return level.

In various examples, the information about the plurality of calls may include, for at least one calling party of the plurality of calls, a number of telephonic devices within the plurality of telephonic devices that received a call from the calling party, the step of analyzing the information about the plurality of calls may include analyzing the number of telephonic devices within the plurality of telephonic devices that received a call from the calling party to identify a threshold number of telephonic devices that indicates illegitimate calling parties, and the step of determining whether the one or more calls from the calling party of the incoming call fit the call pattern of illegitimate calling parties may include determining whether a number of telephonic devices that received the one or more calls from the calling party of the incoming call is greater than the threshold number of telephonic devices.

In some examples, the information about the plurality of calls may include, for at least one calling party of the plurality of calls, a frequency at which the calling party calls telephonic devices within the plurality of telephonic devices, the step of analyzing the information about the plurality of calls may include analyzing the frequency at which the calling party calls telephonic devices within the plurality of telephonic devices to identify a threshold frequency that indicates illegitimate calling parties, and the step of determining whether the one or more calls from the calling party of the incoming call fit the call pattern of illegitimate calling parties may include determining whether a frequency at which the calling party of the incoming call calls telephonic devices within the plurality of telephonic devices is greater than the threshold frequency.

In some examples, the information about the plurality of calls may include, for at least one calling party of the plurality of calls, a ratio of a frequency at which the calling party calls telephonic devices within the plurality of telephonic devices to a number of telephonic devices within the plurality of telephonic devices that received a call from the calling party, the step of analyzing the information about the plurality of calls may include analyzing the ratio of the frequency at which the calling party calls telephonic devices within the plurality of telephonic devices to the number of telephonic devices within the plurality of telephonic devices that received a call from the calling party to identify a threshold ratio that indicates illegitimate calling parties, and the step of determining whether the one or more calls from the calling party of the incoming call fit the call pattern of illegitimate calling parties may include determining whether a ratio of the frequency at which the calling party of the incoming call calls telephonic devices within the plurality of telephonic devices to the number of telephonic devices within the plurality of telephonic devices that received a call from the calling party of the incoming call is below the threshold ratio.

In certain examples, the information about the plurality of calls may include information that indicates whether the calling party of each call within the plurality of calls was present within an address book of the telephonic device on which each call was received, the step of analyzing the information about the plurality of calls may include analyzing the information that indicates whether the calling party of each call within the plurality of calls was present within an address book of the telephonic device on which each call was received to identify a threshold presence level that indicates illegitimate calling parties, and the step of determining whether the one or more calls from the calling party of the incoming call fit the call pattern of illegitimate calling parties may include determining whether a presence level of the calling party of the incoming call is below the threshold presence level.

In some examples, the information about the plurality of calls may include a time at which each call was received, the step of analyzing the information about the plurality of calls may include analyzing the time at which each call was received to identify at least one time period that indicates illegitimate calling parties, and the step of determining whether the one or more calls from the calling party of the incoming call fit the call pattern of illegitimate calling parties may include determining whether a time at which the one or more calls from the calling party of the incoming call were received is within the time period.

In another example, the information about the plurality of calls may include a call-back time at which each call was returned, the step of analyzing the information about the plurality of calls may include analyzing the call-back time at which each call was returned to identify at least one time period that indicates illegitimate calling parties, and the step of determining whether the one or more calls from the calling party of the incoming call fit the call pattern of illegitimate calling parties may include determining whether a call-back time at which the one or more calls from the calling party of the incoming call were returned is within the time period.

In some examples, the information about the plurality of calls may include information that indicates whether each call within the plurality of calls was rejected, the step of analyzing the information about the plurality of calls may include analyzing the information that indicates whether each call within the plurality of calls was rejected to identify a threshold rejection level that indicates illegitimate calling parties, and the step of determining whether the one or more calls from the calling party of the incoming call fit the call pattern of illegitimate calling parties may include determining whether a rejection level of the one or more calls from the calling party of the incoming call is above the threshold rejection level.

In some examples, the information about the plurality of calls may include, for at least one calling party of the plurality of calls, information from a web search engine and/or a web-based database of illegitimate calling parties that indicates whether the calling party is an illegitimate calling party.

In some examples, the step of disposing of the incoming call may include presenting, in response to detecting the incoming call and while the user is receiving the incoming call, information to the user that indicates whether the one or more calls from the calling party of the incoming call fit the call pattern of illegitimate calling parties so that the user can decide how to handle the incoming call.

In some examples, the information that indicates whether the one or more calls from the calling party of the incoming call fit the call pattern of illegitimate calling parties may indicate a likelihood that the incoming call is from an illegitimate calling party.

In some examples, the step of analyzing the information about the plurality of calls may include analyzing the information about the plurality of calls to identify at least one call pattern of fraudulent calling parties, the step of determining whether the one or more calls from the calling party of the incoming call fit the call pattern of illegitimate calling parties may include determining whether the one or more calls from the calling party of the incoming call fit the call pattern of fraudulent calling parties, and the step of disposing of the incoming call may include disposing of the incoming call based at least in part on determining whether the one or more calls from the calling party of the incoming call fit the call pattern of fraudulent calling parties.

In one embodiment, a system for implementing the above-described method may include (1) a collecting module that collects information about a plurality of calls received at a plurality of telephonic devices, (2) an analyzing module that analyzes the information about the plurality of calls to identify at least one call pattern of illegitimate calling parties, (3) a detecting module that detects, at a telephonic device, an incoming call, (4) a determining module that determines whether one or more calls from the calling party of the incoming call fit the call pattern of illegitimate calling parties, (5) a disposing module that disposes of the incoming call based at least in part on determining whether the one or more calls from the calling party of the incoming call fit the call pattern of illegitimate calling parties, and (6) at least one processor that executes the collecting module, the analyzing module, the detecting module, the determining module, and the disposing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) collect information about a plurality of calls received at a plurality of telephonic devices, (2) analyze the information about the plurality of calls to identify at least one call pattern of illegitimate calling parties, (3) detect, at a telephonic device, an incoming call, (4) determine whether one or more calls from the calling party of the incoming call fit the call pattern of illegitimate calling parties, and (5) dispose of the incoming call based at least in part on determining whether the one or more calls from the calling party of the incoming call fit the call pattern of illegitimate calling parties.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
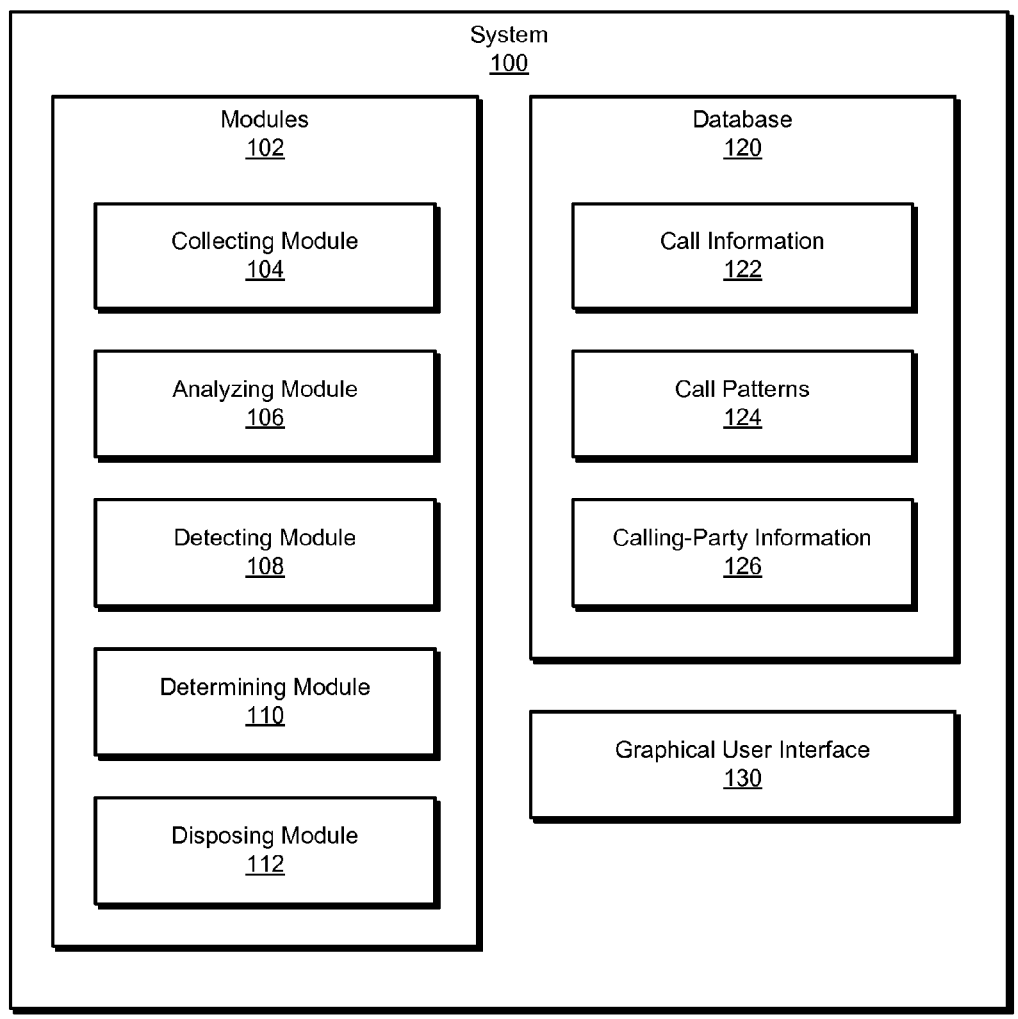
FIG. 1 is a block diagram of an exemplary system for detecting calls from illegitimate calling parties.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting calls from illegitimate calling parties. As will be explained in greater detail below, by employing crowdsourcing techniques to gather information about calls from a variety of calling parties and using this information to model the call patterns of illegitimate and/or legitimate calling parties, the systems and methods described herein may assess the legitimacy of calling parties and detect calls from illegitimate calling parties. Furthermore, in some examples, by modelling the call patterns of fraudulent calling parties and detecting when incoming calls are from fraudulent calling parties, the systems and methods described herein may detect and prevent telephone fraud.

Figure 2:
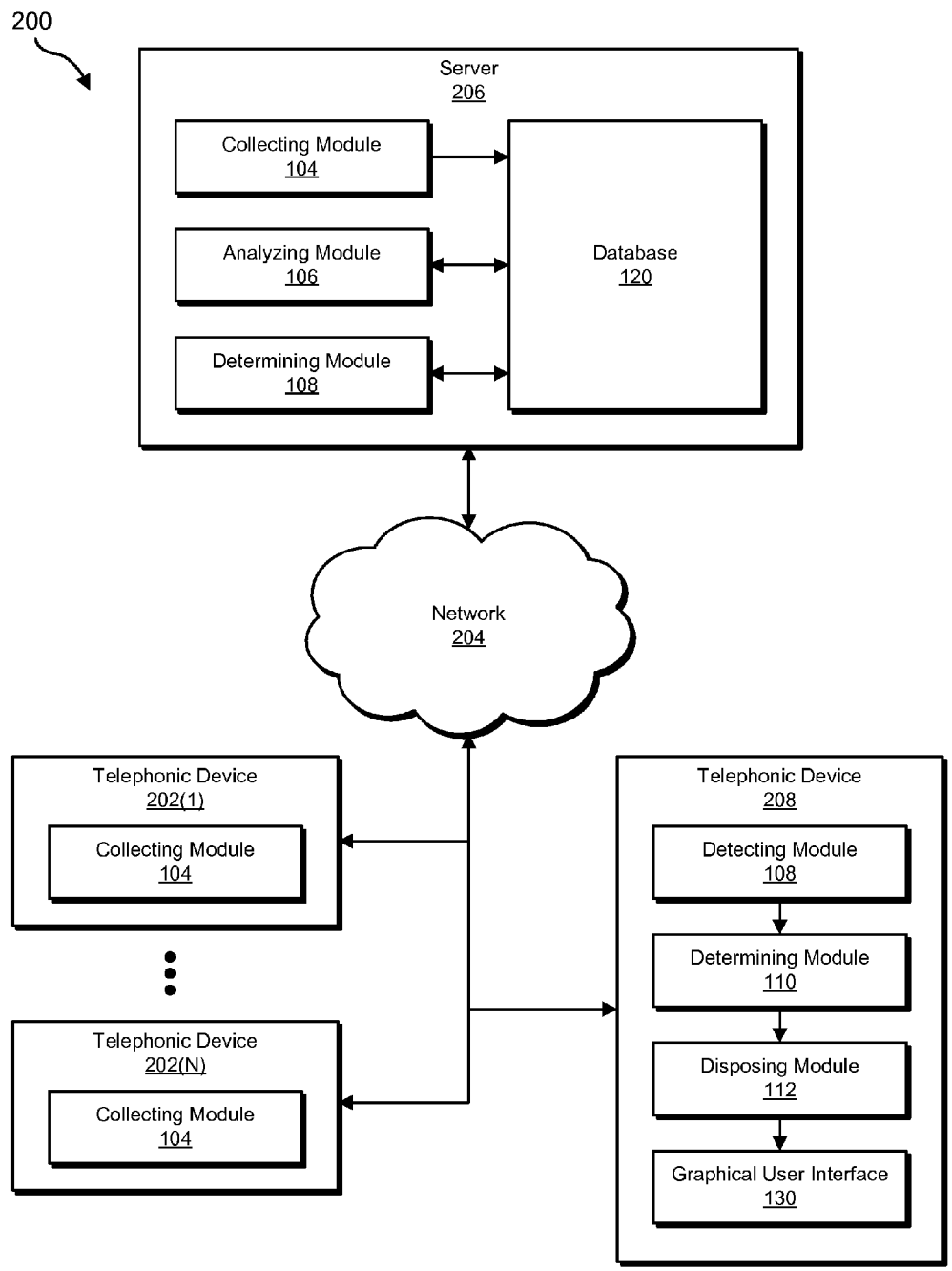
FIG. 2 is a block diagram of an exemplary system for detecting calls from illegitimate calling parties.

The following will provide, with reference to FIGS. 1-2, detailed descriptions of exemplary systems for detecting calls from illegitimate calling parties. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting calls from illegitimate calling parties. As illustrated in this figure, exemplary system 100 may include one or more modules 102 for performing one or more tasks. For example, and as will be explained in greater detail below, exemplary system 100 may include a collecting module 104 that collects information about a plurality of calls received at a plurality of telephonic devices. Exemplary system 100 may also include an analyzing module 106 that analyzes the information about the plurality of calls to identify at least one call pattern of illegitimate calling parties.

In addition, and as will be described in greater detail below, exemplary system 100 may include a detecting module 108 that detects, at a telephonic device, an incoming call. Exemplary system 100 may also include a determining module 110 that determines whether one or more calls from the calling party of the incoming call fit the call pattern of illegitimate calling parties. Exemplary system 100 may further include a disposing module 112 that disposes of the incoming call based at least in part on determining whether the one or more calls from the calling party of the incoming call fit the call pattern of illegitimate calling parties. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., telephonic devices 202(1)-(N), server 206, and/or telephonic device 208), computing system 610 in FIG. 6, and/or portions of exemplary network architecture 700 in FIG. 7. In at least one example, one or more of modules 102 in FIG. 1 may represent a client-side application running on a computing device that enables calls to be received and/or placed via the computing device and/or an application running on a computing device that is capable of monitoring calls received at and/or placed on the computing device. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include call information 122 for storing information about one or more calls, call patterns 124 for storing information about one or more call patterns of illegitimate and/or legitimate calling parties, and calling-party information 126 for storing information about one or more illegitimate and/or legitimate calling parties. Exemplary system 100 may also include a graphical user interface 130 for displaying information about illegitimate and/or legitimate calling parties.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include telephonic devices 202(1)-(N), a server 206, and a telephonic device 208 in communication via a network 204. Telephonic devices 202(1)-(N) and/or telephonic device 208 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of telephonic devices 202(1)-(N), server 206, and/or telephonic device 208, facilitate telephonic devices 202(1)-(N), server 206, and/or telephonic device 208 in detecting calls from illegitimate calling parties. For example, and as will be described in greater detail below, one or more of modules 102 may cause telephonic devices 202(1)-(N), server 206, and/or telephonic device 208 to (1) collect information about a plurality of calls received at telephonic devices 202(1)-(N), (2) analyze the information about the plurality of calls to identify at least one call pattern of illegitimate calling parties, (3) detect, at telephonic device 208, an incoming call, (4) determine whether one or more calls from the calling party of the incoming call fit the call pattern of illegitimate calling parties, and (5) dispose of the incoming call based at least in part on determining whether the one or more calls from the calling party of the incoming call fit the call pattern of illegitimate calling parties.

Telephonic devices 202(1)-(N) and telephonic device 208 generally represent any type or form of computing device capable of reading computer-executable instructions and/or receiving calls. Examples of telephonic devices 202(1)-(N) and telephonic device 208 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. In at least one example, telephonic devices 202(1)-(N) may represent the telephonic devices of users that have agreed to submit information about the calls they receive to server 206.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between telephonic devices 202(1)-(N), server 206, and/or telephonic device 208.

Figure 3:
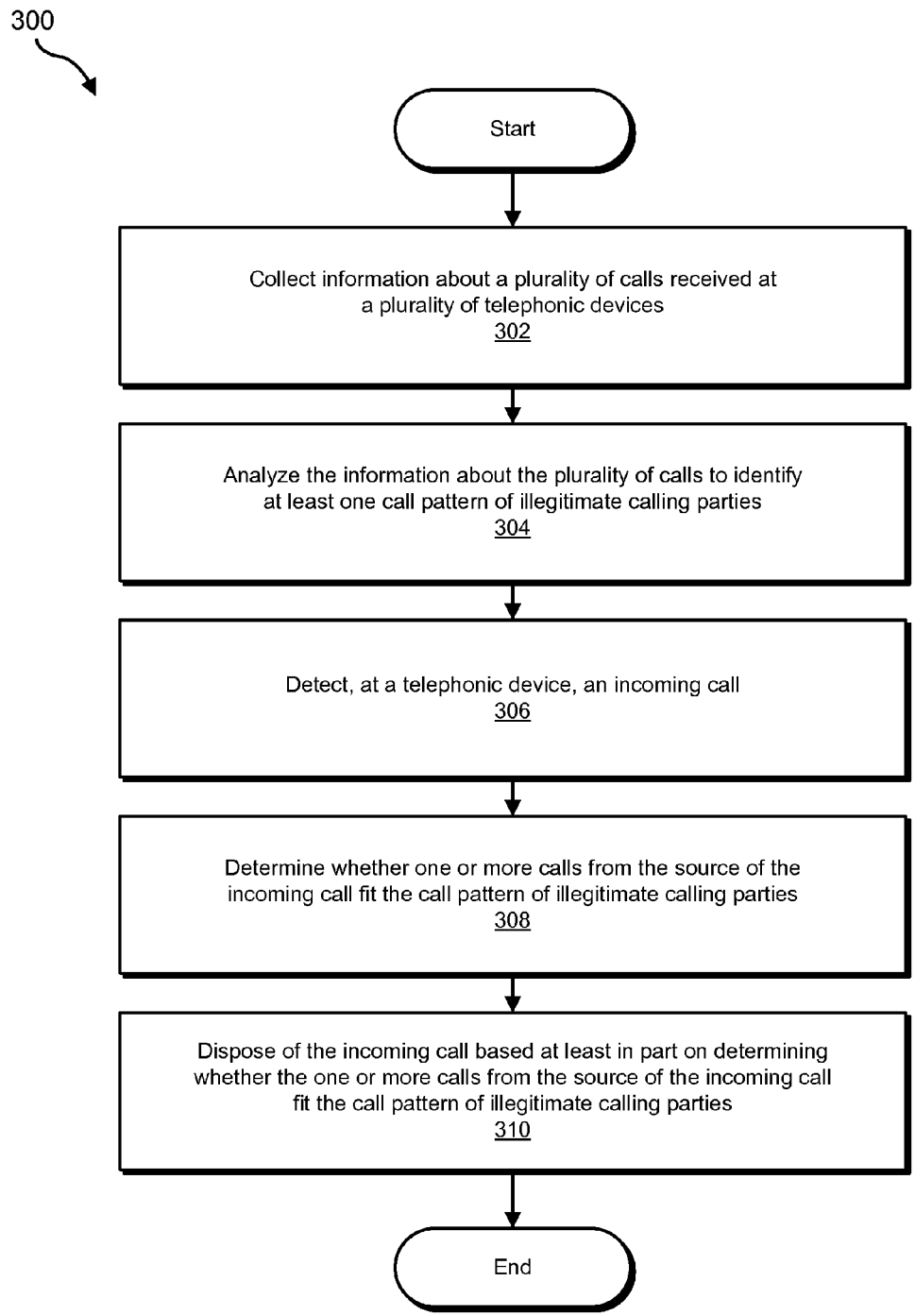
FIG. 3 is a flow diagram of an exemplary method for detecting calls from illegitimate calling parties.

FIG. 3 is a flow diagram of an exemplary computer-implemented method 300 for detecting calls from illegitimate calling parties. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may collect information about a plurality of calls received at a plurality of telephonic devices. For example, at step 302 collecting module 104 may, as part of one or more of telephonic devices 202(1)-(N) in FIG. 2, collect information about any or all calls received at telephonic devices 202(1)-(N).

As used herein, the term "call" may generally refer to any communication session between two or more parties (e.g., a calling party and a called party) and/or any attempt to initiate such a communication session. In various examples, the term "call" may refer to an audio communication session, a video communication session, and/or a text-messaging session. In at least one example, the term "call" may refer to a telephone call. The term "telephonic device", as used herein, may generally refer to any device that is capable of receiving calls. Examples of telephonic devices may include, without limitation, telephones, cellular phones, smartphones, laptops, desktops, and/or tablets. In some examples, the term "telephonic device" may refer to any computing device that is configured to run an application that is capable of receiving calls (e.g., a voice over Internet Protocol (VoIP) application).

The systems described herein may perform step 302 in any suitable manner. In one example as illustrated in FIG. 2, collecting module 104 may collect, as part of each of telephonic devices 202(1)-(N), information about the calls received at telephonic devices 202(1)-(N) by (1) monitoring calls received at each of telephonic devices 202(1)-(N), (2) compiling information about the calls received at telephonic devices 202(1)-(N) that may be useful in identifying call patterns of illegitimate and/or legitimate calling parties, and (3) uploading this information to server 206. For example, when a user of telephonic device 202(1) receives a call via telephonic device 202(1), collecting module 104 may, as part of telephonic device 202(1), compile information about the call and may upload a small packet containing this information to server 206. As part of server 206, collecting module 104 may store this information to call information 122 within database 120. In at least one example, collecting module 104 may protect the privacy of called parties by anonymizing any call information obtained from the called parties.

In some examples, collecting module 104 may collect information about calls received at a telephonic device as part of a client-side application that is installed and running on the telephonic device. For example, collecting module 104 may represent a portion of a client-side application that enables calls to be received at and/or placed on a telephonic device and/or an application that is capable of monitoring calls received at and/or placed on a telephonic device. In general, collecting module 104 may collect information about the calls received at a telephonic device only after a user of the telephonic device has opted into submitting information about the calls that the user receives. In at least one example, collecting module 104 may automatically and transparently collect information about the calls received at the telephonic device without requiring any additional user action.

Collecting module 104 may collect a variety of information about the calls that it monitors that may be useful in identifying call patterns of illegitimate and/or legitimate calling parties. For example, collecting module 104 may collect, for each call that it detects, information that includes an identifier of the calling party (e.g., the calling party's telephone number), an identifier of the called party (e.g., the called party's telephone number), the time at which the call was received, information that indicates whether or not the call was accepted or rejected by the called party, the duration of the call, information that indicates whether or not the calling party was in the called party's address book, information that indicates whether or not the area codes of the calling party and the called party match, information that indicates whether or not the call was returned (e.g., a call-back time), and/or a frequency at which the calling party calls the called party.

In addition to collecting information about individual calls, collecting module 104 may collect information about calling parties that may be useful in identifying call patterns of illegitimate and/or legitimate calling parties. For example, collecting module 104 may examine the information about individual calls that it has received to determine for at least one calling party (1) the number of telephonic devices that received a call from the calling party, (2) the frequency at which the calling party makes calls, (3) the ratio of the frequency at which the calling party makes calls to the number of telephonic devices that received a call from the calling party. Collecting module 104 may store this information to calling-party information 126.

Additionally and/or alternatively, collecting module 104 may collect information that indicates whether a calling party is or is likely an illegitimate calling party from one or more web search engines and/or web-based databases of illegitimate calling parties (e.g., websites containing user-provided information about harassing and/or unknown calling parties). For example, collecting module 104 may determine that a calling party is likely illegitimate if the phone number of the calling party is mostly found within web-based databases of illegitimate calling parties. Alternatively, collecting module 104 may determine that a calling party is likely legitimate if the phone number of the calling party is mostly found on legitimate websites. Collecting module 104 may store this information to calling-party information 126.

As will be explained in greater detail below, by collecting information about the calls that are received at a large number of telephonic devices, the systems and methods described herein may accurately identify call patterns of illegitimate and/or legitimate calling parties that may be used to distinguish illegitimate calling parties from legitimate calling parties.

Figure 4:
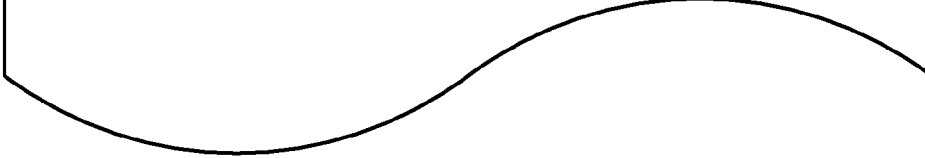
FIG. 4 is a diagram of exemplary call information.
Figure 5:
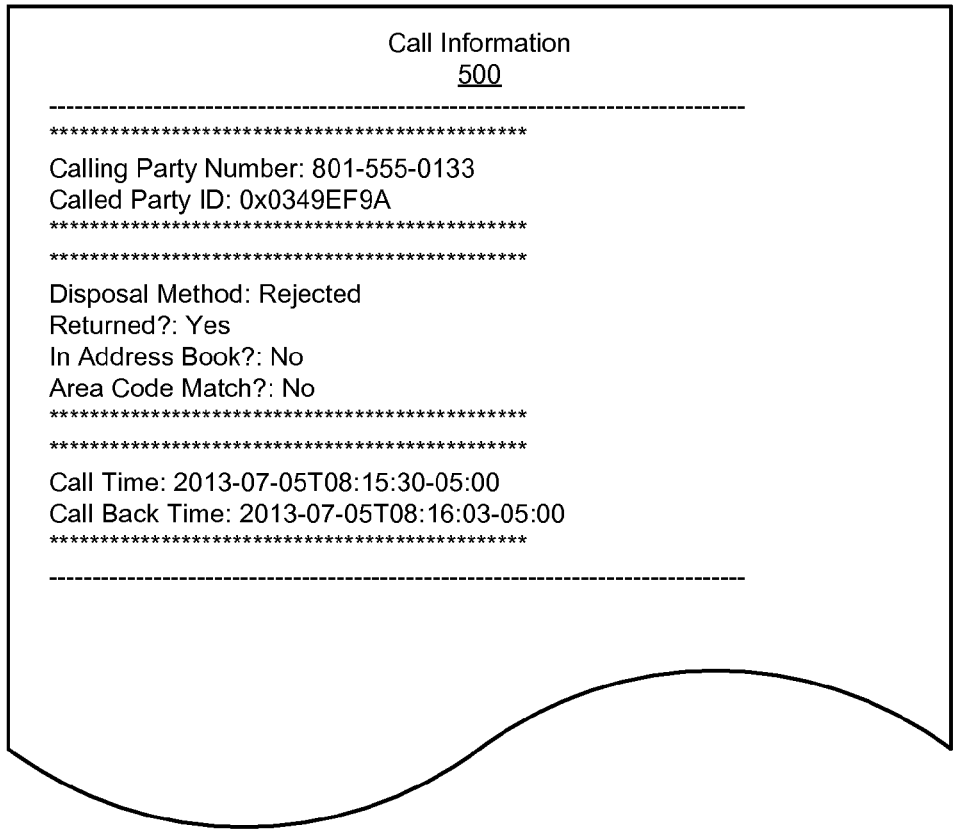
FIG. 5 is a diagram of exemplary call information.

FIGS. 4 and 5 illustrate examples of the kind of call information that may be gathered by the systems and methods described herein. FIG. 4 is a diagram of exemplary call information 400. Call information 400 provides an example of the kind of information that collecting module 104 may collect and upload to server 206 when a call is received and accepted. As shown in FIG. 4, call information 400 may include an identifier of the calling party (in this example, the telephone number of the calling party), an identifier of the called party, an indication that the call was accepted, an indication that the calling party was not present within the called party's address book, an indication that the area codes of the calling party and the called party do not match, the time at which the call was received, and the call's duration.

FIG. 5 is a diagram of exemplary call information 500. Call information 500 provides an example of the kind of information that collecting module 104 may collect and upload to server 206 when a call is first rejected and later returned. As shown in FIG. 5, call information 500 may include an identifier of the calling party, an identifier of the called party, an indication that the call was rejected, an indication that the call was returned, an indication that the calling party was not present within the called party's address book, an indication that the area codes of the calling party and the called party do not match, the time at which the call was received, and the time at which the called party returned the call.

Returning to FIG. 3 at step 304, one or more of the systems described herein may analyze the information about the plurality of calls to identify at least one call pattern of illegitimate calling parties. For example, at step 304 analyzing module 106 may, as part of server 206 in FIG. 2, analyze the information about the plurality of calls collected at step 302 to identify at least one call pattern of illegitimate calling parties.

As used herein, the term "illegitimate calling party" may generally refer to any source of unwanted calls. For example, an illegitimate calling party may be the source of fraudulent calls, harassing calls, unsolicited calls, nuisance calls, and/or any other type of call that users may not want to receive. Examples of illegitimate calling parties may include, without limitation, fraudulent telemarketers, phishers, calling parties that employ autodialers, calling parties that employ robocalls, and/or high-pressure telemarketers. On the other hand, the term "legitimate calling party" may generally refer to any source of wanted calls. Examples of legitimate calling parties may include, without limitation, friends, family, laypeople, and/or legitimate businesses.

The systems described herein may perform step 304 in any suitable manner. In one example, analyzing module 106 may analyze, using any suitable pattern recognition algorithm and/or heuristic, the information about the plurality of calls collected at step 302 for call patterns of illegitimate calling parties and/or call patterns of legitimate calling parties. Analyzing module 106 may then create a model based on the call patterns of illegitimate calling parties and/or the call patterns of legitimate calling parties that is capable of determining the legitimacy of calling parties.

In at least one example, analyzing module 106 may analyze the information about the plurality of calls using, as ground-truth data, information gathered from web search engines and/or web-based databases of illegitimate calling parties that indicates whether calling parties are or are not illegitimate. For example, analyzing module 106 may train the model for determining the legitimacy of calling parties using the features of the information about the plurality of calls and the information that indicates whether calling parties are or are not illegitimate.

Analyzing module 106 may identify a variety of call patterns of illegitimate calling parties by analyzing the information about the plurality of calls. In one example, analyzing module 106 may identify call patterns of illegitimate calling parties based on call durations. For example, analyzing module 106 may identify a call pattern of illegitimate calling parties that indicates that a calling party is likely to be illegitimate if the average duration of its calls is below a determined threshold call duration.

In some examples, analyzing module 106 may identify call patterns of illegitimate calling parties based on call acceptance levels. For example, analyzing module 106 may identify a call pattern of illegitimate calling parties that indicates that a calling party is likely to be illegitimate if the percentage of its calls that are accepted is below a determined threshold acceptance level.

In other examples, analyzing module 106 may identify call patterns of illegitimate calling parties based on call return levels. For example, analyzing module 106 may identify a call pattern of illegitimate calling parties that indicates that a calling party is likely to be illegitimate if the percentage of its calls that are returned is below a determined threshold return level.

In another example, analyzing module 106 may identify call patterns of illegitimate calling parties based on call spreads. For example, analyzing module 106 may identify a call pattern of illegitimate calling parties that indicates that a calling party is likely to be illegitimate if the number of telephonic devices that it calls is greater than a determined threshold number of telephonic devices.

In at least one example, analyzing module 106 may identify call patterns of illegitimate calling parties based on call frequencies. For example, analyzing module 106 may identify a call pattern of illegitimate calling parties that indicates that a calling party is likely to be illegitimate if the frequency at which it makes calls is greater than a determined threshold frequency.

In some examples, analyzing module 106 may identify call patterns of illegitimate calling parties based on ratios of call frequencies to call spreads. For example, analyzing module 106 may identify a call pattern of illegitimate calling parties that indicates that a calling party is likely to be illegitimate if the frequency at which it makes calls divided by the number of telephonic devices that it calls is below a determined threshold ratio.

In other examples, analyzing module 106 may identify call patterns of illegitimate calling parties based on address-book presence. For example, analyzing module 106 may identify a call pattern of illegitimate calling parties that indicates that a calling party is likely to be illegitimate if the percentage of its calls that are made to telephonic devices with address books within which the calling party is present is below a determine threshold presence level.

In another example, analyzing module 106 may identify call patterns of illegitimate calling parties based on call times. For example, analyzing module 106 may identify a call pattern of illegitimate calling parties that indicates that a calling party is likely to be illegitimate if it makes the majority of its calls during a determined time period.

In one example, analyzing module 106 may identify call patterns of illegitimate calling parties based on call-back times. For example, analyzing module 106 may identify a call pattern of illegitimate calling parties that indicates that a calling party is likely to be illegitimate if the majority of its calls are returned within a determined time period.

In certain examples, analyzing module 106 may identify call patterns of illegitimate calling parties based on rejection levels. For example, analyzing module 106 may identify a call pattern of illegitimate calling parties that indicates that a calling party is likely to be illegitimate if the percentage of its calls that are rejected is greater than a specific threshold rejection level.

In some examples, analyzing module 106 may identify the call patterns of one or more categories of illegitimate and/or legitimate calling parties. For example, analyzing module 106 may identify the call patterns of fraudulent calling parties so that fraudulent calling parties may be distinguished from other kinds of illegitimate and/or legitimate calling parties. In another example, analyzing module 106 may identify the call patterns of calling parties that employ autodialers so that calling parties that employ autodialers may be distinguished from other kinds of illegitimate and/or legitimate calling parties.

At step 306, one or more of the systems described herein may detect, at a telephonic device, an incoming call. For example, at step 306 detecting module 108 may, as part of telephonic device 208 in FIG. 2, detect an incoming call. The systems described herein may perform step 306 in any suitable manner. In one example, detecting module 108 may represent a portion of an application running on a telephonic device that enables calls to be received at and/or placed on the computing device and as such may detect when an incoming call is received via the application. In another example, detecting module 108 may represent a portion of an application running on a telephonic device that is capable of monitoring calls received at and/or placed on telephonic device and as such may detect when an incoming call is received at the telephonic device.

At step 308, one or more of the systems described herein may determine whether one or more calls from the calling party of the incoming call fit the call pattern of illegitimate calling parties. For example, at step 308 determining module 110 may, as part of server 206 and/or telephonic device 208 in FIG. 2, determine whether one or more calls from the calling party of the incoming call detected at step 306 fit any of the call patterns of illegitimate calling parties identified at step 304.

The systems described herein may perform step 308 in any suitable manner. In one example, determining module 110 may determine, before or after the incoming call is detected, whether one or more calls from the calling party of the incoming call fit call patterns of illegitimate calling parties using the model for determining the legitimacy of calling parties that was created as part of step 304. In general, determining module 110 may determine whether one or more calls from the calling party of the incoming call fit the call pattern of illegitimate calling parties as a way of determining the legitimacy of the calling party and/or the legitimacy of the incoming call. For example, if determining module 110 determines that one or more calls from the calling party of the incoming call fit call patterns of illegitimate calling parties, determining module 110 may determine that the calling party of the incoming call is likely illegitimate and, as a result, may determine that the incoming call is likely illegitimate. On the other hand, if determining module 110 determines that one or more calls from the calling party of the incoming call fit call patterns of legitimate calling parties, determining module 110 may determine that the calling party of the incoming call is likely legitimate and, as a result, may determine that the incoming call is likely legitimate.

In some examples, determining module 110 may base its determination on whether past calls from the calling party of the incoming call fit call patterns of illegitimate calling parties based on information about the past calls that was received from the calling party at telephonic devices 202(1)-(N) (e.g., the call information collected as part of step 302). In at least one example, determining module 110 may base its determination on whether the most recent calls from the calling party of the incoming call fit call patterns of illegitimate calling parties.

After determining whether one or more calls from the calling party of the incoming call fit the call pattern of illegitimate calling parties, determining module 110 may store an assessment of the legitimacy of the calling party to calling-party information 126. Determining module 110 may then reference this assessment of the legitimacy of the calling party whenever incoming calls are detected from the calling party. For example when the incoming call is detected at telephonic device 208, determining module 110 may, as part of telephonic device 208, query server 206 for an assessment of the calling party of the incoming call.

In some examples, determining module 110 may base its determination on whether the incoming call fits call patterns of illegitimate calling parties based on information about the incoming call. For example, when the incoming call is detected at telephonic device 208, determining module 110 may, as part of telephonic device 208, compile information about the incoming call and may upload a small packet containing this information to server 206 as part of a request for an assessment of the legitimacy of the calling party.

At step 310, one or more of the systems described herein may dispose of the incoming call based at least in part on determining whether the one or more calls from the calling party of the incoming call fit the call pattern of illegitimate calling parties. For example, at step 310 disposing module 112 may, as part of telephonic device 208 in FIG. 2, dispose of the incoming call based at least in part on determining whether the one or more calls from the calling party of the incoming call fit the call pattern of illegitimate calling parties. Upon completion of step 310, exemplary method 300 in FIG. 3 may terminate.

The systems described herein may perform step 310 in any suitable manner. In one example, disposing module 112 may dispose of the incoming call detected at telephonic device 208 by displaying to the user of telephonic device 208, either automatically or in response to a request from the user, a message that indicates the legitimacy of the calling party and/or the legitimacy of the incoming call so that the user can decide how to handle the incoming call. For example if the calling party is or is likely illegitimate, disposing module 112 may display a message to the user that indicates that the calling party is illegitimate and/or suspicious. Similarly if the calling party is or is likely legitimate, disposing module 112 may display a message to the user that indicates that the calling party is legitimate and/or not suspicious. If a determination of the legitimacy of the calling party cannot be made (e.g., because little information about the calling party is known), disposing module 112 may display a message to the user that indicates that not enough information is known about the calling party to make an assessment of its legitimacy.

In some examples, disposing module 112 may display to the user of telephonic device 208 a variety of options to handle the incoming call based on whether one or more of the calls of the calling party fit the call pattern of illegitimate calling parties. For example, disposing module 112 may display to the user the option of answering the incoming call if the calling party is likely legitimate and may display to the user the option of sending the calling party to voice mail, rejecting the incoming call, and/or blocking calls from the calling party if the calling party is likely illegitimate.

In at least one example, disposing module 112 may automatically dispose of the incoming call based on determining whether the one or more calls from the calling party of the incoming call fit the call pattern of illegitimate calling parties. For example, disposing module 112 may automatically and/or transparently block calls from calling parties that are or are likely illegitimate.

As explained above, by employing crowdsourcing techniques to gather information about calls from a variety of calling parties and using this information to model the call patterns of illegitimate and/or legitimate calling parties, the systems and methods described herein may assess the legitimacy of calling parties and detect calls from illegitimate calling parties. Furthermore, in some examples, by modelling the call patterns of fraudulent calling parties and detecting when incoming calls are from fraudulent calling parties, the systems and methods described herein may detect and prevent telephone fraud. For example, the systems described herein may represent (1) a client-side application that monitors calls on the telephonic devices of a large number of end-users, collects information about calls received on the telephonic devices, and disposes of calls at the telephonic devices based on legitimacy assessments of calling parties and (2) a server-side application that gathers call information from the client-side application, analyzes the call information to identify call patterns of legitimate and/or illegitimate calling parties, and uses the call patterns of legitimate and/or illegitimate calling parties to assess the legitimacy of calling parties.

Figure 6:
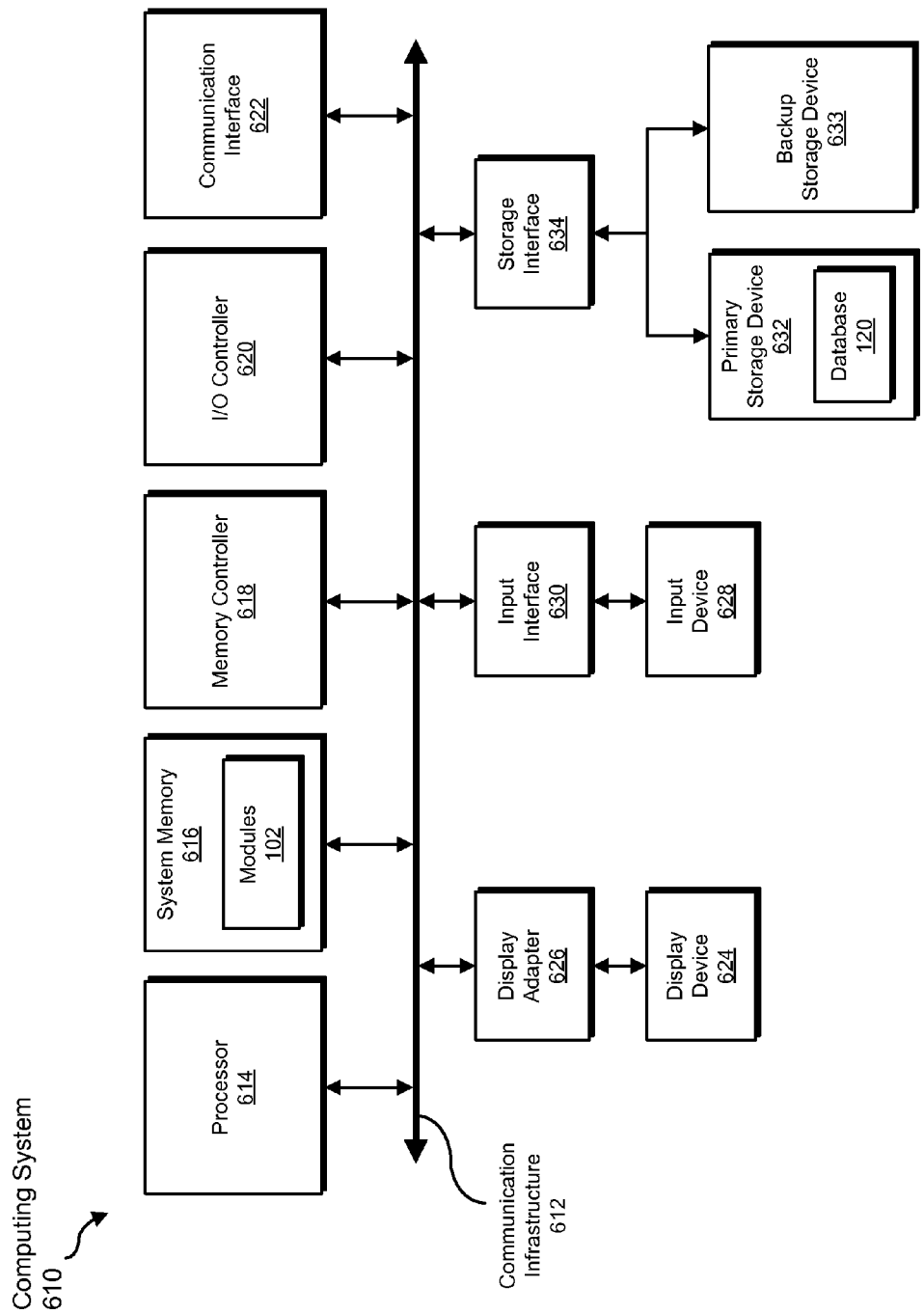
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
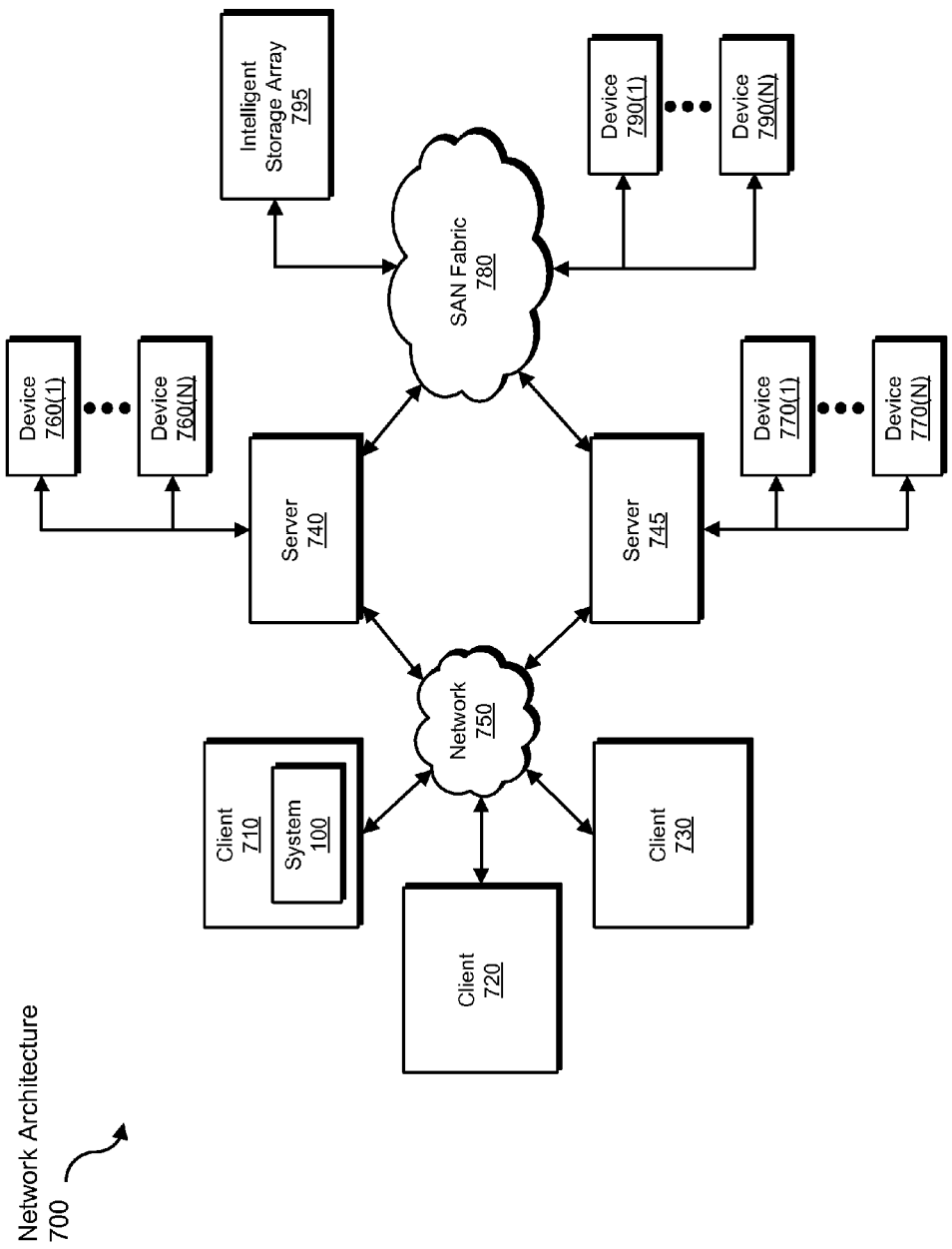
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750.

As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting calls from illegitimate calling parties.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data about a plurality of calls received at a plurality of telephonic devices, transform the data about the plurality of calls into a model for determining the legitimacy of calls and/or calling parties based on the call patterns of legitimate and/or illegitimate calling parties, output a result of the transformation to a system for determining the legitimacy of calls and/or calling parties, use the result of the transformation to determine the legitimacy of calls and/or call calling parties, and store the result of the transformation to a system for storing information about the call patterns of legitimate and/or illegitimate calling parties. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting calls from illegitimate calling parties, at least a portion of the method being performed by at least one computing device comprising at least one processor, the method comprising:

automatically and transparently collecting, at each of a plurality of telephonic devices by a client-side application installed on each of the plurality of telephonic devices, information about a plurality of calls that were initially directed to and received at the plurality of telephonic devices, wherein the information about the plurality of calls comprises:

an identifier of the calling party of each call within the plurality of calls; and information that indicates whether the calling party of each call within the plurality of calls was present within an address book of the called party to which each call within the plurality of calls was initially directed;

receiving, by a server-side system from the client-side application installed on the plurality of telephonic devices, the information about the plurality of calls;

analyzing, by the server-side system, the information about the plurality of calls that was automatically and transparently collected without any user action to identify at least one call pattern within the information about the plurality of calls that was automatically and transparently collected without any user action that indicates a call from an illegitimate calling party by analyzing the information that indicates whether the calling party of each call within the plurality of calls was present within an address book of the telephonic device on which each call was received to identify a threshold presence level that indicates illegitimate calling parties;

detecting, at a telephonic device by the client-side application installed on the telephonic device, an incoming call;

determining whether one or more calls from the calling party of the incoming call fit the call pattern that indicates a call from an illegitimate calling party by determining whether a presence level of the calling party of the incoming call is below the threshold presence level; and disposing, at the telephonic device by the client-side application installed on the telephonic device, of the incoming call based at least in part on determining whether the one or more calls from the calling party of the incoming call fit the call pattern that indicates a call from an illegitimate calling party.

2. The computer-implemented method of claim 1, wherein:

the information about the plurality of calls further comprises a duration of each call within the plurality of calls;

analyzing the information about the plurality of calls further comprises analyzing the duration of each call within the plurality of calls to identify a threshold duration that indicates illegitimate calling parties;

determining whether the one or more calls from the calling party of the incoming call fit the call pattern that indicates a call from an illegitimate calling party further comprises determining whether a duration of the one or more calls from the calling party of the incoming call is shorter than the threshold duration.

3. The computer-implemented method of claim 1, wherein:

the information about the plurality of calls further comprises information that indicates whether each call within the plurality of calls was accepted by the called party to which each call within the plurality of calls was initially directed;

analyzing the information about the plurality of calls further comprises analyzing the information that indicates whether each call within the plurality of calls was accepted to identify a threshold acceptance level that indicates illegitimate calling parties;

determining whether the one or more calls from the calling party of the incoming call fit the call pattern that indicates a call from an illegitimate calling party further comprises determining whether an acceptance level of the one or more calls from the calling party of the incoming call is below the threshold acceptance level.

4. The computer-implemented method of claim 1, wherein:

the information about the plurality of calls further comprises information that indicates whether each call within the plurality of calls was returned by the called party to which each call within the plurality of calls was initially directed;

analyzing the information about the plurality of calls further comprises analyzing the information that indicates whether each call within the plurality of calls was returned to identify a threshold return level that indicates illegitimate calling parties;

determining whether the one or more calls from the calling party of the incoming call fit the call pattern that indicates a call from an illegitimate calling party further comprises determining whether a return level of the one or more calls from the calling party of the incoming call is below the threshold return level.

5. The computer-implemented method of claim 1, wherein:

the information about the plurality of calls further comprises, for at least one calling party of the plurality of calls, a number of telephonic devices within the plurality of telephonic devices to which the calling party directed a call;

analyzing the information about the plurality of calls further comprises analyzing the number of telephonic devices within the plurality of telephonic devices to which the calling party directed a call to identify a threshold number of telephonic devices that indicates illegitimate calling parties;

determining whether the one or more calls from the calling party of the incoming call fit the call pattern that indicates a call from an illegitimate calling party further comprises determining whether a number of telephonic devices that received the one or more calls from the calling party of the incoming call is greater than the threshold number of telephonic devices.

6. The computer-implemented method of claim 1, wherein:

the information about the plurality of calls further comprises, for at least one calling party of the plurality of calls, a frequency at which the calling party directs calls to telephonic devices within the plurality of telephonic devices;

analyzing the information about the plurality of calls further comprises analyzing the frequency at which the calling party directs calls to telephonic devices within the plurality of telephonic devices to identify a threshold frequency that indicates illegitimate calling parties;

determining whether the one or more calls from the calling party of the incoming call fit the call pattern that indicates a call from an illegitimate calling party further comprises determining whether a frequency at which the calling party of the incoming call calls telephonic devices is greater than the threshold frequency.

7. The computer-implemented method of claim 1, wherein:

the information about the plurality of calls further comprises, for at least one calling party of the plurality of calls, a ratio of a frequency at which the calling party directs calls to telephonic devices within the plurality of telephonic devices to a number of telephonic devices within the plurality of telephonic devices to which the calling party directed a call;

analyzing the information about the plurality of calls further comprises analyzing the ratio of the frequency at which the calling party directs calls to telephonic devices within the plurality of telephonic devices to the number of telephonic devices within the plurality of telephonic devices to which the calling party directed a call to identify a threshold ratio that indicates illegitimate calling parties;

determining whether the one or more calls from the calling party of the incoming call fit the call pattern that indicates a call from an illegitimate calling party further comprises determining whether a ratio of a frequency at which the calling party of the incoming call calls telephonic devices within the plurality of telephonic devices to a number of telephonic devices that received the one or more calls from the calling party of the incoming call is below the threshold ratio.

8. The computer-implemented method of claim 1, wherein:

the information about the plurality of calls further comprises a time at which each call was received at the telephonic device to which each call was initially directed;

analyzing the information about the plurality of calls further comprises analyzing the time at which each call was received to identify at least one time period that indicates illegitimate calling parties;

determining whether the one or more calls from the calling party of the incoming call fit the call pattern that indicates a call from an illegitimate calling party further comprises determining whether a time at which the one or more calls from the calling party of the incoming call were received is within the time period.

9. The computer-implemented method of claim 1, wherein:

the information about the plurality of calls further comprises a call-back time at which each call was returned by the called party to which each call was initially directed;

analyzing the information about the plurality of calls further comprises analyzing the call-back time at which each call was returned to identify at least one time period that indicates illegitimate calling parties;

determining whether the one or more calls from the calling party of the incoming call fit the call pattern that indicates a call from an illegitimate calling party further comprises determining whether a call-back time at which the one or more calls from the calling party of the incoming call were returned is within the time period.

10. The computer-implemented method of claim 1, wherein:

the information about the plurality of calls further comprises information that indicates whether each call within the plurality of calls was rejected by the called party to which each call within the plurality of calls was initially directed;

analyzing the information about the plurality of calls further comprises analyzing the information that indicates whether each call within the plurality of calls was rejected to identify a threshold rejection level that indicates illegitimate calling parties;

determining whether the one or more calls from the calling party of the incoming call fit the call pattern that indicates a call from an illegitimate calling party further comprises determining whether a rejection level of the one or more calls from the calling party of the incoming call is above the threshold rejection level.

11. The computer-implemented method of claim 1, wherein analyzing the information about the plurality of calls further comprises analyzing additional information that indicates whether at least one calling party of the plurality of calls is an illegitimate calling party, wherein the additional information that indicates whether the calling party is an illegitimate calling party is collected via at least one of:

a web search engine;

a web-based database of illegitimate calling parties.

12. The computer-implemented method of claim 1, wherein disposing of the incoming call comprises presenting, in response to detecting the incoming call and while a user of the telephonic device is receiving the incoming call, information to the user that indicates whether the one or more calls from the calling party of the incoming call fit the call pattern that indicates a call from an illegitimate calling party so that the user can decide how to handle the incoming call.

13. The computer-implemented method of claim 12, wherein the information that indicates whether the one or more calls from the calling party of the incoming call fit the call pattern that indicates a call from an illegitimate calling party indicates a likelihood that the incoming call is from an illegitimate calling party.

14. The computer-implemented method of claim 1, wherein the steps of receiving, analyzing, and determining are performed by the server-side system as part of a cloud-based service.

15. A system for detecting calls from illegitimate calling parties, the system comprising:

a client-side collecting module that automatically and transparently collects, at each of a plurality of telephonic devices as part of a client-side application installed on each of the plurality of telephonic devices, information about a plurality of calls that were initially directed to and received at the plurality of telephonic devices, wherein the information about the plurality of calls comprises:

an identifier of the calling party of each call within the plurality of calls;

information that indicates whether the calling party of each call within the plurality of calls was present within an address book of the called party to which each call within the plurality of calls was initially directed;

a server-side collecting module that receives, as part of a server-side system from the client-side application installed on the plurality of telephonic devices, the information about the plurality of calls that were initially directed to and received at the plurality of telephonic devices;

an analyzing module that analyzes, as part of the server-side system, the information about the plurality of calls that was automatically and transparently collected without any user action to identify at least one call pattern within the information about the plurality of calls that was automatically and transparently collected without any user action that indicates a call from an illegitimate calling party by analyzing the information that indicates whether the calling party of each call within the plurality of calls was present within an address book of the telephonic device on which each call was received to identify a threshold presence level that indicates illegitimate calling parties;

a detecting module that detects, at a telephonic device as part of the client-side application installed on the telephonic device, an incoming call;

a determining module that determines whether one or more calls from the calling party of the incoming call fit the call pattern that indicates a call from an illegitimate calling party by determining whether a presence level of the calling party of the incoming call is below the threshold presence level;

a disposing module that disposes, at the telephonic device as part of the client-side application installed on the telephonic device, of the incoming call based at least in part on determining whether the one or more calls from the calling party of the incoming call fit the call pattern that indicates a call from an illegitimate calling party; and at least one processor that executes the client-side collecting module, the server-side collecting module, the analyzing module, the detecting module, the determining module, and the disposing module.

16. The system of claim 15, wherein:

the information about the plurality of calls further comprises a duration of each call within the plurality of calls;

the analyzing module analyzes the information about the plurality of calls by further analyzing the duration of each call within the plurality of calls to identify a threshold duration that indicates illegitimate calling parties;

the determining module determines whether the one or more calls from the calling party of the incoming call fit the call pattern that indicates a call from an illegitimate calling party by further determining whether a duration of the one or more calls from the calling party of the incoming call is shorter than the threshold duration.

17. The system of claim 15, wherein:

the information about the plurality of calls further comprises information that indicates whether each call within the plurality of calls was accepted by the called party to which each call within the plurality of calls was initially directed;

the analyzing module analyzes the information about the plurality of calls by further analyzing the information that indicates whether each call within the plurality of calls was accepted to identify a threshold acceptance level that indicates illegitimate calling parties;

the determining module determines whether the one or more calls from the calling party of the incoming call fit the call pattern that indicates a call from an illegitimate calling party by further determining whether an acceptance level of the one or more calls from the calling party of the incoming call is below the threshold acceptance level.

18. The system of claim 15, wherein:

the information about the plurality of calls further comprises information that indicates whether each call within the plurality of calls was returned by the called party to which each call within the plurality of calls was initially directed;

the analyzing module analyzes the information about the plurality of calls by further analyzing the information that indicates whether each call within the plurality of calls was returned to identify a threshold return level that indicates illegitimate calling parties;

the determining module determines whether the one or more calls from the calling party of the incoming call fit the call pattern that indicates a call from an illegitimate calling party by further determining whether a return level of the one or more calls from the calling party of the incoming call is below the threshold return level.

19. A non-transitory computer-readable medium comprising one or more computer-executable instructions that, when executed by at least one processor of at least one computing device, cause the computing device to:

automatically and transparently collect, at each of a plurality of telephonic devices by a client-side application installed on each of the plurality of telephonic devices, information about a plurality of calls that were initially directed to and received at the plurality of telephonic devices, wherein the information about the plurality of calls comprises:

an identifier of the calling party of each call within the plurality of calls;

information that indicates whether the calling party of each call within the plurality of calls was present within an address book of the called party to which each call within the plurality of calls was initially directed;

receive, by a server-side system from the client-side application installed on the plurality of telephonic devices, the information about the plurality of calls that were initially directed to and received at the plurality of telephonic devices;

analyze, by the server-side system, the information about the plurality of calls that was automatically and transparently collected without any user action to identify at least one call pattern within the information about the plurality of calls that was automatically and transparently collected without any user action that indicates a call from an illegitimate calling party by analyzing the information that indicates whether the calling party of each call within the plurality of calls was present within an address book of the telephonic device on which each call was received to identify a threshold presence level that indicates illegitimate calling parties;

detect, at a telephonic device by the client-side application installed on the telephonic device, an incoming call;

determine whether one or more calls from the calling party of the incoming call fit the call pattern that indicates a call from an illegitimate calling party by determining whether a presence level of the calling party of the incoming call is below the threshold presence level; and dispose, at the telephonic device by the client-side application installed on the telephonic device, of the incoming call based at least in part on determining whether the one or more calls from the calling party of the incoming call fit the call pattern that indicates a call from an illegitimate calling party.

* * * * *